United States Patent [19]

Freier, Jr. et al.

[11] Patent Number: 4,711,073
[45] Date of Patent: Dec. 8, 1987

[54] CLIPPING PROPULSION MEANS FOR TRACTOR MOWER

[75] Inventors: Edward Freier, Jr.; Daniel W. Schaefer, both of Port Washington, Wis.

[73] Assignee: Simplicity Manufacturing, Inc., Port Washington, Wis.

[21] Appl. No.: 880,204

[22] Filed: Jun. 30, 1986

[51] Int. Cl.⁴ .............................................. A01D 34/70
[52] U.S. Cl. ..................................... 56/13.3; 56/16.6; 56/202
[58] Field of Search ...................... 56/13.3, 13.4, 16.6, 56/16.9, 194, 14.5, 202

[56] References Cited

U.S. PATENT DOCUMENTS

| | | | |
|---|---|---|---|
| 2,920,435 | 1/1960 | Vallone | 56/13.3 |
| 3,037,339 | 6/1962 | Nicholson | 56/202 |
| 3,065,588 | 11/1962 | Shaw | 56/16.6 |
| 3,657,865 | 4/1972 | Ober | 56/16.6 |
| 3,906,709 | 9/1975 | Rhodes | 56/13.3 |
| 4,081,947 | 4/1978 | Szymanis | 56/13.3 |
| 4,114,353 | 9/1978 | Ansbaugh et al. | 56/13.3 |
| 4,433,532 | 2/1984 | McCunn | 56/16.6 |
| 4,532,755 | 8/1985 | Schemelin et al. | 56/16.6 |
| 4,614,080 | 9/1986 | Hoepfner et al. | 56/16.6 |

*Primary Examiner*—Stephen J. Novosad
*Assistant Examiner*—Bruce M. Kisliuk
*Attorney, Agent, or Firm*—James E. Nilles; James R. Custin

[57] ABSTRACT

An impeller is mounted above the top wall of the housing of a mower carried by a riding vehicle, near the side of the mower at which it has its clipping outlet. The rotor of the impeller rotates on a vertical axis that is between the clipping outlet and the vertical axis of the mower blade nearest that outlet and is driven by a belt engaging a pulley on the spindle for that blade. Flat paddle-like blades of the rotor have a portion of their orbit in an upwardly and rearwardly extending passage defined by the front portion of a clipping duct that communicates the mower clipping outlet with a receptacle at the rear of the vehicle. The impeller draws air and clippings out of the mower housing and propels them rearward through the duct.

9 Claims, 6 Drawing Figures

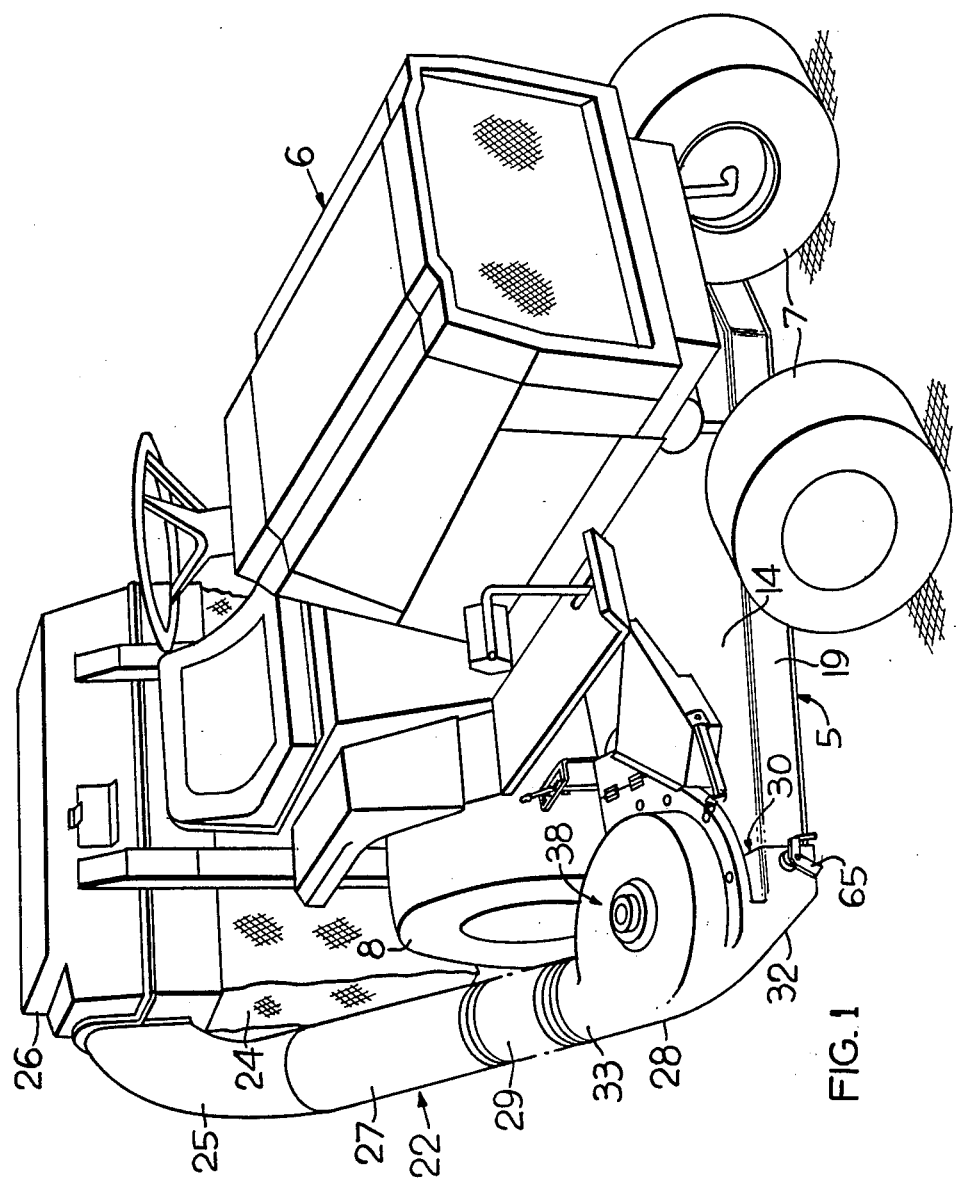

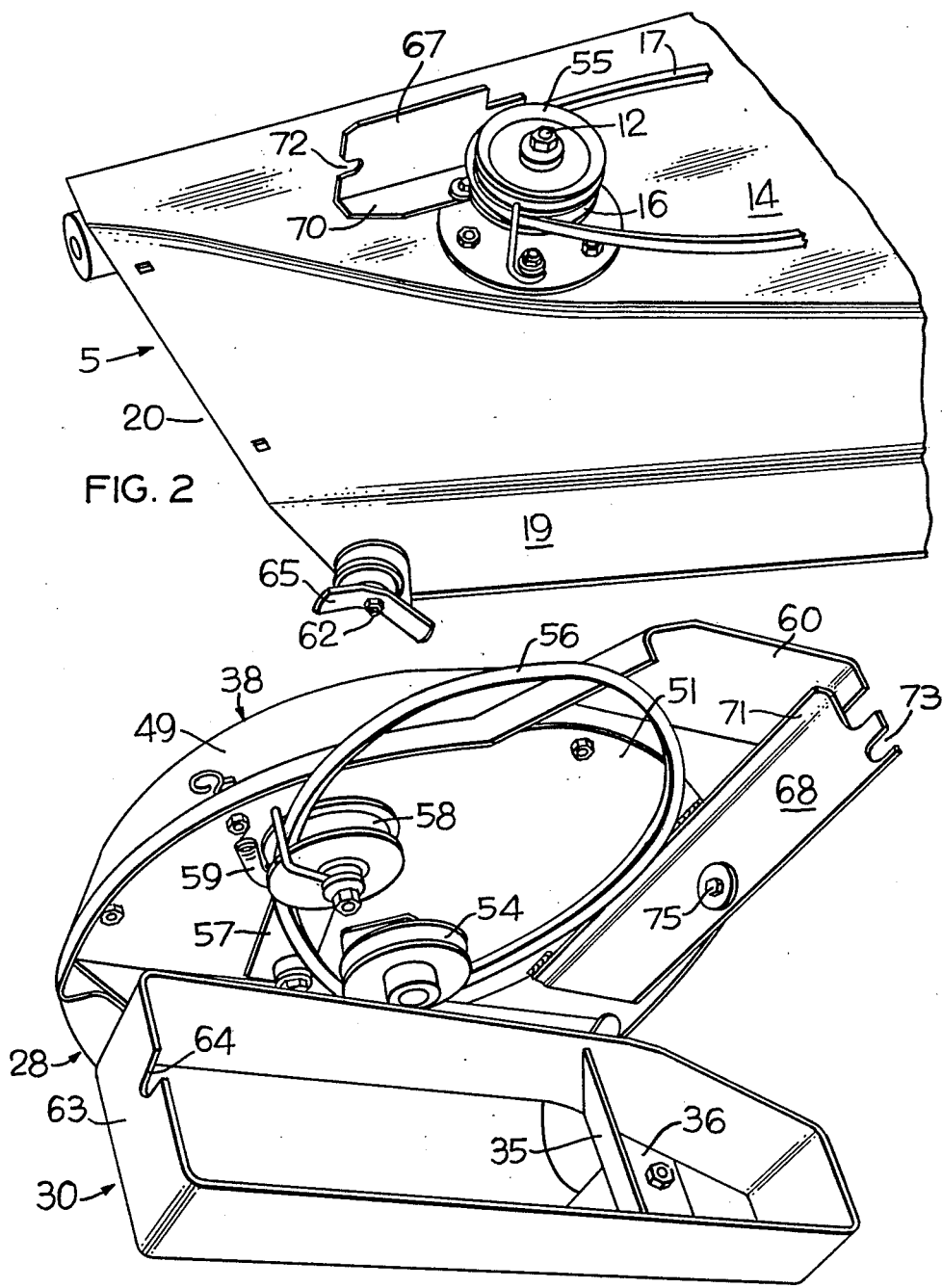

CLIPPING PROPULSION MEANS FOR TRACTOR MOWER

FIELD OF THE INVENTION

This invention relates to means whereby clippings produced by a mower that is carried at the underside of a riding vehicle are propelled rearwardly and upwardly through a duct that extends from a clipping outlet at one side of the mower housing to a clipping receptacle at the rear of the vehicle; and the invention is more particularly concerned with clipping propulsion means comprising an impeller mounted on the mower housing and driven from the same power drive means that drives the mower blades.

BACKGROUND OF THE INVENTION

U.S. Pat. No. 4,532,755, which is assigned to the assignee of this application, discloses clipping collection apparatus for cooperation with a rotary mower carried at the underside of a riding vehicle, whereby clippings produced by the mower are conducted through a clipping duct that extends rearwardly and upwardly along one side of the vehicle, from a mower housing clipping outlet opening to that side of the vehicle to a clipping receptacle carried on the rear of the vehicle. In that apparatus the rotary mower blade adjacent to the clipping outlet has relatively large trailing edge lift portions at its tips so that its rotation induces a strong airflow out through the mower housing clipping outlet and rearwardly along the clipping duct. The front portion of the clipping duct is so configured as to cause a minimum of resistance to this airflow and to extend as nearly as possible in the direction of the trajectories of clippings passing through the outlet, so that clippings have little tendency to impact the inner wall surfaces of the clipping duct but are instead carried in an airstream flowing smoothly along the duct. Such constant, non-plugging flow of clippings along the clipping duct is further promoted by the configuration of the discharge portion of the clipping duct and of a cover for the clipping receptacle, which are designed to cooperate in preventing clippings from being substantially decelerated until they are over the part of the clipping receptacle into which they are intended to fall.

This prior apparatus was highly successful with two-spindle rotary mowers but was found not to be satisfactory with threespindle mowers. A three-spindle mower is one that has three cutting blades, mounted on spindles spaced apart transversely to the direction of travel of the mower. In the usual case a three-spindle mower cuts a wider swath than a two-spindle mower but its blades are of smaller radius than those of a two-spindle mower. Because of its smaller tip orbit, the blade adjacent to the clipping outlet of a three-spindle mower is inherently unable to produce the high airflow generated by its counterpart on a two-spindle mower. Nevertheless, the wider swath cut by a three-spindle machine produces a substantially heavier flow of clippings to be propelled through the mower housing clipping outlet and along the duct to the clipping receptacle.

Since a three-spindle mower cannot, by itself, produce a strong enough airflow for satisfactorily propelling its high volume clipping output into the clipping receptacle, a supplementary airflow must be generated by means of an impeller. Several impeller arrangements for this purpose have been proposed heretofore, but every such prior arrangement has had one or more significant disadvantages.

U.S. Pat. No. 4,433,532 discloses apparatus wherein a blower is located at the rear of the vehicle and draws in air from the clipping receptacle, through a screen. Air discharged from the blower is pumped forward through an air tube and is discharged into the front end portion of the clipping duct through a rearwardly opening nozzle that accelerates it to a high velocity. The airstream issuing from the nozzle produces a suction forwardly of the nozzle whereby air is drawn out of the mower housing, and to the rear of the nozzle the discharged air accelerates the flow of clippings along the clipping duct. The presence of the blower tends to reduce the capacity of the clipping receptacle, but a more significant disadvantage of this arrangement is that the air tube and the clipping duct constitute a rather cumbersome and expensive assembly. Their connection must be maintained under the rather severe vibration to which mowing apparatus is subjected but must nevertheless be readily disconnectable. There is also a possibility that the apparatus would not operate well under all conditions, since the air discharge nozzle in the clipping duct presents a surface against which clippings tend to impact and upon which they are therefore likely to build up into a plug that would block the clipping duct and defeat the purpose of the blower.

Each of U.S. Pat. Nos. 3,037,339 and 3,657,865 discloses a paddle-vane impeller at the discharge side of a mower housing, rotating on a horizontal axis and intended to impart a rearward and upward acceleration to clippings issuing from the mower housing discharge outlet. An obvious disadvantage of these devices is that the bulky impeller projects both laterally beyond the mower housing and to a substantial height above it and thus interferes with mowing along a row of lowgrowing bushes or in a similar confined space. Furthermore, a relatively complicated 90° transmission is needed for driving such an impeller, since its axis is at right angles to the upright mower blade spindles.

U.S. Pat. No. 4,114,353 discloses a paddle-vane impeller mounted outwardly adjacent to the mower housing clipping outlet of a three-spindle mower, rotating on a vertical axis and situated in approximately the plane of the cutting blades, to receive the clippings issuing from the clipping outlet and propel them rearwardly towards a receptacle. This arrangement also interferes with mowing in confined spaces because the impeller has its entire diameter at one side of the swath cut by the mower blades. Furthermore, the size of the clipping outlet tends to be effectively restricted by the impeller unless it has a relatively large diameter, since the impeller vanes are effective to draw clippings out of the mower housing only in the quadrant of their orbit in which they are nearest the mower blades and moving away from them.

U.S. Pat. Nos. 2,920,435 and 3,065,588 disclose single-spindle mowers, each having its clipping outlet centered in the rear portion of its mower housing and having an impeller mounted over the clipping outlet to draw clippings out of the housing and propel them rearward into a receptacle. Such an arrangement is obviously suitable only for a single-spindle mower and therefore offers no suggestion that could be usefully applied to a multi-spindle mower, which must have a sidewardly opening clipping outlet.

U.S. Pat. Nos. 4,361,000 and 4,407,112 disclose single-spindle rotary mowers wherein a blower is mounted above the cutting blade, concentrically with its spindle and driven by that spindle. The housing of a multiple-spindle mower could not be formed to accommodate the air flow pattern intended to be produced by such a coaxial blower; hence these patents offer no suggestion for solving a problem that is peculiar to apparatus comprising a three-spindle mower.

One arrangement employed with a three-spindle mower is illustrated generally by U.S. Pat. No. 4,104,852, wherein a vacuum-producing blower is mounted on the rear of the riding vehicle that carries the mower and is driven from the power takeoff on that vehicle. The clipping duct leads rearwardly from the mower clipping outlet to the intake of the blower, and the blower discharges rearwardly into a clipping receptacle that is carried on the vehicle by means of rearwardly projecting brackets. The blower and the clipping receptacle thus function in essentially the same manner as a vacuum sweeper. Although generally satisfactory, this apparatus is not completely trouble-free with wet or juicy clippings because they must undergo successive abrupt changes of direction in the course of flow to and through the blower.

Since the blower in the last described apparatus must pump a substantially high volume of air in order to produce enough vacuum to suck clippings into it, it draws a substantial amount of power from the vehicle engine, which must also power the mower and propel the vehicle. In a commonly used variant of this expedient, therefore, the blower and the clipping receptacle are carried by a trailer cart that is towed behind the mower-carrying vehicle, and the blower is powered by an engine mounted on that cart. From the functional standpoint this is perhaps the most satisfactory clipping collection apparatus heretofore devised for cooperation with a three-spindle mower, but it is obviously expensive because of the separate engine needed for powering the blower, together with the trailer chassis needed for carrying that engine, the blower and the clipping receptacle. Because of the additional engine this apparatus is relatively noisy in operation. The requirement for towing a trailer is also a disadvantage because it decreases the maneuverability of the mower.

From the foregoing review of the prior art, it will be apparent that there has been a long-standing unsatisfied need for simple, compact, inexpensive and functionally satisfactory clipping collection apparatus suitable for cooperation with a three-spindle mower carried at the underside of a riding vehicle and whereby clippings produced by the mower are reliably propelled away from the sidewardly opening discharge outlet in the mower housing and are driven into a clipping receptacle at the rear of the vehicle. It will also be apparent from the foregoing discussion that the problem of satisfying this need is a complicated one that poses numerous requirements.

SUMMARY OF THE INVENTION

The general object of the present invention is to provide apparatus of the character described, comprising an impeller whereby clippings are drawn out of the mower housing of a multiple spindle mower carried at the underside of a riding vehicle and are propelled to a clipping receptacle at the rear of the vehicle, said apparatus being so efficient in operation that plugging of the clipping duct rarely if ever occurs, compact enough not to interfere with maneuvering of the vehicle in confined places, capable of being driven by the vehicle engine without robbing it of power needed for vehicle propulsion and mower operation, mechanically sturdy and easily serviced, and nevertheless substantially lower in cost than the most satisfactory apparatus heretofore available for the purpose.

Another object of the invention is to provide compact and inexpensive apparatus of the character described that comprises an impeller which is mounted on the mower housing, adjacent to the front of a clipping duct that extends rearwardly and upwardly from the mower housing clipping outlet towards a clipping receptacle, said impeller being so arranged as to provide for a nearly straight-line flow of clippings through the clipping outlet and along most of the length of the clipping duct, so that the clipping flow path presents no impact surfaces upon which clippings can settle and build up into a plug.

It is also an object of this invention to provide clipping propulsion apparatus of the character described that is well adapted for cooperation with a clipping duct and a cooperating clipping receptacle which have the combination of features described in the above mentioned patent No. 4,532,755.

A specific but important object of the invention is to provide clipping propulsion means in apparatus of the character described that operates at a low noise level and is so located and arranged as to provide minimum interference with mowing under shrubbery and in other confined places.

In general, these and other objects of the invention that will appear as the description proceeds are obtained in mowing apparatus of this invention, which comprises a riding vehicle such as a garden tractor, a mower carried beneath said vehicle that comprises a mower housing with a top wall and with a clipping outlet at one side thereof and at least one cutting blade in said mower housing, adjacent to said clipping outlet and rotatable about an upright blade axis that is spaced towards the other side of the mower from said clipping outlet, a clipping receptacle near a rear end of the vehicle, a clipping duct for conducting clippings from the clipping outlet to the receptacle, and impeller means for propelling clippings along said clipping duct. In the apparatus of this invention the clipping duct has a front section that defines a passage which extends upwardly and rearwardly from said clipping outlet and a portion of which is above the level of the top wall of the mower housing. Said impeller means comprises a rotor having a rotor axis and a plurality of vanes, each of which has a tip portion that extends edgewise substantially radially and parallel to the rotor axis, said vanes being rotatable about the rotor axis for movement of their tip portions in a vane orbit. The invention is further characterized by means rotatably mounting the rotor above the top wall of the mower housing with the rotor axis upright and so located bewteen said blade axis and the clipping outlet that a portion of said vane orbit is in said portion of said passage. An impeller housing above the top wall of the mower housing cooperates with said front section of the clipping duct to enclose the rotor, and it defines a chamber which opens to said passage and which closely surrounds the rotor around the remainder of said vane orbit. The invention is further characterized by drive means for rotating the rotor in the direction such that the tip portions of its vanes move substantially rearward in said portion of the vane orbit.

The rotor preferably has a coaxial shaft which extends through and beneath a bottom wall of the impeller housing that is spaced above the top wall of the mower housing, and a driven pulley fixed on the lower end portion of that shaft is connected by a belt with a driving pulley fixed on the top of an upright blade-carrying spindle which is rotatably driven from power means on the vehicle.

BRIEF DESCRIPTION OF THE DRAWINGS

In the accompanying drawings, which illustrate what is now regarded as a preferred embodiment of the invention:

FIG. 1 is a front perspective view of a tractor carrying a mower, clipping collection apparatus and clipping propulsion means embodying the principles of this invention;

FIG. 2 is a top view of the clipping discharge end portion of the mower housing, with the clipping propulsion impeller and clipping duct removed therefrom;

FIG. 3 is a perspective view of the clipping propulsion means and the front portion of the clipping duct, looking obliquely upwardly and outwardly, generally in the direction that clippings flow through that portion of the clipping duct;

DETAILED DESCRIPTION OF PREFERRED EMBODIMENTS OF THE INVENTION

Figure 4:
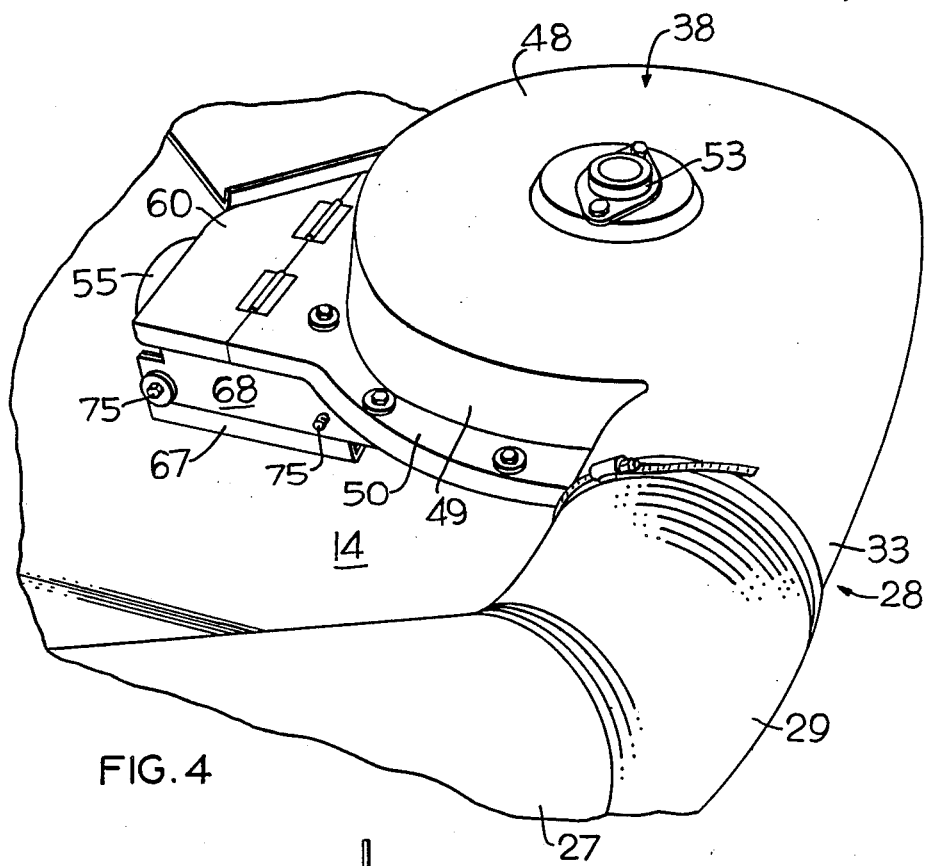
FIG. 4 is a perspective view of the clipping impeller and the front end portion of the clipping duct, mounted on the mower housing, looping obliquely downwardly and forwardly.
Figure 5:
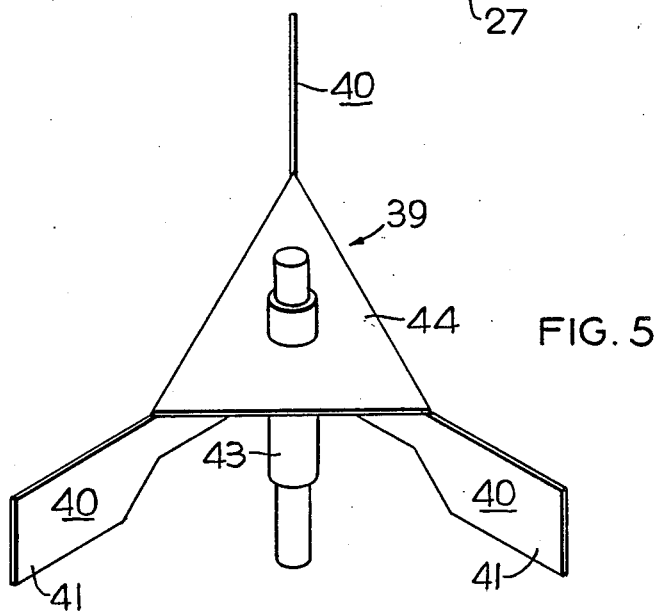
FIG. 5 is a perspective view of the impeller rotor.

Apparatus embodying the principles of the present invention is suitable for cooperation with a single-spindle mower or a two-spindle mower, but its advantages are most clearly apparent in its combination with a three-spindle mower 5, as herein illustrated and described.

As is conventional, the mower 5 is mounted at the underside of a riding vehicle 6 such as a small tractor, between its front wheels 7 and its rear wheels 8. Each of the three cutting blades 9 of the mower (only one can be seen in the drawings) is fixed to the bottom of an upright spindle 12 that is journaled in the top wall 14 of a mower housing that encloses the blades. A driven pulley 16 is attached to the upper end portion of each spindle 12, above the housing top wall 14, and driving belts 17 are trained around these pulleys 16 and a power takeoff drive pulley (not shown) on the vehicle. It will be understood that the power takeoff pulley is driven from the vehicle engine (not shown), which also supplies power for vehicle propulsion, and that the belts 17 and pulleys 16 comprise a mower blade driving transmission which is generally conventional and which is therefore not illustrated in detail.

In addition to the top wall 14 that overlies the cutting blades 9, the mower housing has a skirt wall 19 which projects down from the top wall in surrounding relation to the three blades. At one side of the mower there is a gap or opening 20 in the skirt wall that provides a mower housing clipping outlet through which clippings produced by the mower pass out of the housing.

In this case the apparatus includes a clipping duct 22 into which the clipping outlet 20 discharges and which extends rearwardly and upwardly for conducting clippings to a receptacle 24 that is mounted on the rear of the vehicle. The clipping duct 22 extends along the side of the vehicle to which the mower clipping outlet 20 opens, and its rearmost section comprises an elbow 25 by which the rearwardly flowing stream of clippings is turned through about 90° for discharge in lateral flow towards the opposite side of the vehicle and across the top of the clipping receptacle 24. Overlying the clipping receptacle is a cover 26 which has features that prevent abrupt deceleration of clippings issuing from the clipping duct and whereby filling of the receptacle 24 is controlled. Reference may be made to U.S. Pat. No. 4,532,755 for a complete disclosure concerning the rear elbow section 25 of the clipping duct, the clipping receptacle cover 26, the clipping receptacle 24, the manner in which those parts cooperate with one another, and the means for mounting them on the rear of the vehicle.

A medial section 27 of the clipping duct 22 comprises a straight length of tubing, preferably of transparent plastic, which extends at an upward and rearward inclination along the side of the vehicle. The rear end portion of this tubular section 27 telescopes into the elbow 25, and its front end portion is connected, as by means of a short length 29 of corrugated flexible ducting, with a front clipping duct section 28 that is described hereinafter. From a theoretical standpoint, for reasons explained in U.S. Pat. No. 4,532,755, the clipping duct 22 would preferably define, all along its length, a passage that has an elliptical cross-section with its major axis vertical; but it has been found that the present invention affords satisfactory and trouble free operation with a circular-section clipping duct passage, and therefore this less expensive configuration would be preferred for most practical applications.

Figure 6:
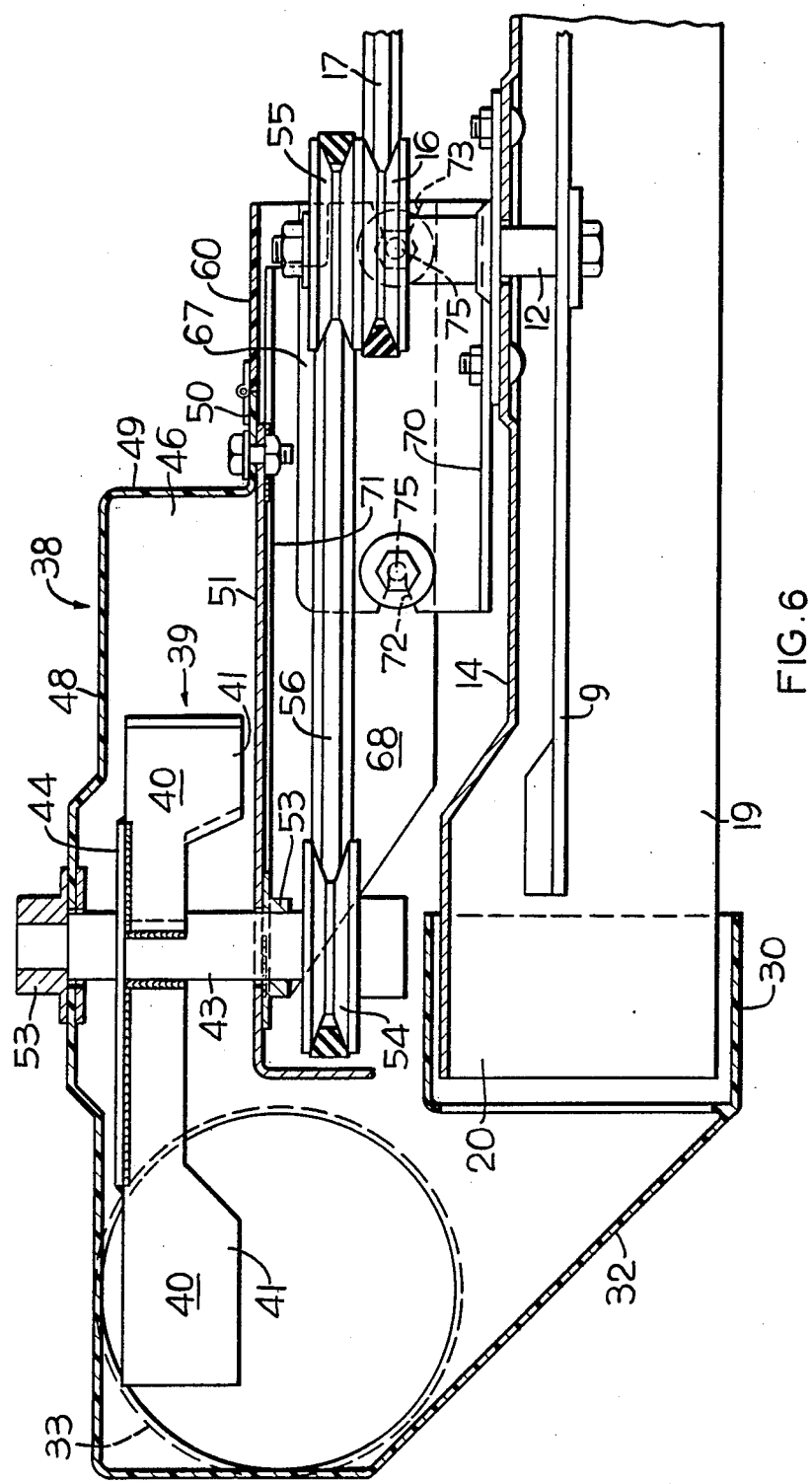
FIG. 6 is a fragmentary view in vertical section, through the impeller, the front end portion of the clipping duct and the discharge end portion of the mower, taken on a plane that extends lengthwise through the mower housing.

The front section 28 of the clipping duct defines a clipping passage which extends obliquely upwardly and rearwardly from the mower housing clipping outlet 20 to conduct clippings from it into the tubular section 27 of the clipping duct. This front duct section has a box-like lower part 30 which fits over the outlet end of the mower housing and which is thus open at its mower side to receive that end portion of the housing. The box-like lower part of the front duct section has a deflector wall 32 (best seen in FIG. 6) that is inclined upwardly from the bottom of the clipping outlet, and it merges into a rearwardly projecting spout-like portion 33 that has its rear end connected with the tubular medial section 27 of the clipping duct, as explained above. The spout-like portion 33 is substantially wholly at a level above the top wall 14 of the mower housing and it lies substantially wholly at the outer side of a vertical plane containing the clipping outlet but is tangent to that plane.

To ensure that clippings will be discharged through the mower housing clipping outlet 20 in a rearwardly and sidewardly oblique trajectory, the lower box-like section has a baffle plate 35 therein (see FIG. 3), connected with a short side wall 36 at its rear, so that the mower housing clipping outlet 20 is open to the front clipping duct section only opposite the front outer quadrant of the disc swept by the mower blade 9 that is adjacent to the clipping outlet.

At a distance above its box-like bottom part, the front duct section has an impeller housing portion 38 which projects sidewardly from its spout portion 33 to overlie the top wall 14 of the mower housing in upwardly spaced relation to that top wall. A paddle-vane rotor 39 in the impeller housing 38 rotates on an upright axis which is located intermediate the clipping outlet side of the mower housing and the axis of the spindle 12 for the mower blade 9 nearest that side of the mower housing.

The vanes 40 of the impeller rotor are preferably flat and have straight top edges and downwardly widened tip portions 41. At least the tip portion 41 of each vane (and suitably the whole of it) extends edgewise radially from the rotor axis and parallel to it, which is to say that the surfaces of each vane tip portion lie substantially in a plane that contains the rotor axis. Preferably the rotor has three vanes which are welded to a rotor shaft 43, and it also comprises a supporting plate 44 in the form of an equilateral triangle, through the center of which the rotor shaft 43 extends and which is welded to the straight upper edges of the vanes. Obviously the vanes 40 and the supporting plate 44 of the rotor could be of plastic, molded in one piece.

The impeller housing 38 defines a chamber 46 which opens to the clipping duct and the walls of which closely surround the rotor 39 around a major portion of the orbit of its vanes; but in the remainder of their orbit the tip portions of the rotor vanes project a substantial distance into the clipping passage in the front clipping duct section and move substantially rearwardly in that passage. This last mentioned minor portion of their orbit is just in front of the spout-like portion 33, and as the rotor vanes move through that portion of their orbit they serve to draw air and grass clippings out of the mower housing through its clipping outlet and drive them upwardly and rearwardly through the clipping duct. Since the clippings are entrained in an airstream that has about the same velocity and moves in about the same direction as the tip portions of the rotor vanes in the clipping duct, there is no significant change in the direction of flow of the airstream or the clippings as they pass the impeller and there is little impacting of its vanes against clippings; consequently the impeller operates quietly and with little tendency for clippings to stick to its vanes.

The front section 28 of the clipping duct and most of the impeller housing 38 are preferably made of a suitable plastic and can be molded in one piece. The plastic portion of the impeller housing comprises a top wall 48, a side wall 49 which projects down from the top wall and merges into the spout-like portion 33, and a radially outwardly projecting flange 50 around the bottom of the side wall 49. Bolted to the underside of the flange 50 is a metal plate 51 which forms the bottom wall of the impeller housing. The rotor shaft 43 is journaled in bearings 53 that are secured to the top and bottom walls 48, 51 of the housing and has a lower end portion which projects below the lower one of these bearings and on which a driven pulley 54 is secured.

As previously mentioned each of the mower blade spindles 12 has a driven pulley 16 secured to its upper end portion, for rotatably driving its mower blade. On the spindle for the blade 9 nearest the discharge outlet 20 there is a driving pulley 55, secured directly above its driven pulley 16, and the impeller rotor 39 is driven for rotation in the same direction as the mower blades by means of a belt 56 trained around this driving pulley 55 and the driven pulley 54 on the rotor shaft. Swingable across the underside of the blower housing bottom wall 51 is an arm 57 which carries an idler pulley 58 at its free end and which is biased by a tension spring 59 in the direction of its swinging motion that engages the idler pulley 58 against the belt 56 to maintain the latter tensioned around the driving pulley 55 and the driven pulley 54. The impeller rotor 39 is thus driven from the vehicle engine through a simple and compact transmission which is mainly located in the vertically shallow space between the top wall 14 of the mower housing and the bottom wall 51 of the impeller housing and is for the most part guarded by the impeller housing. For guarding the driving pulley 55 and its adjacent portion of the belt 56, a guard plate 60 is hingedly connected to the impeller housing 38 to swing up from and down to a horizontal position overlying said pulley 55, and is preferably spring urged towards that position.

The box-like lower part 30 of the front duct section has connected walls which can closely embrace the discharge end portion of the mower housing, and thus the box-like part can be installed on the mower housing by sliding it into place from the discharge side thereof. Such installation of the box-like lower part 30 also brings the impeller housing 38 to its operative position over the mower housing. For holding the front duct section 28 in place on the mower housing, an outwardly projecting threaded stud 62 is secured to one wall of the mower housing and is received in a slot 64 in the overlying wall of the box-like part 30. In this case the stud 62 is secured to the skirt wall 19 at the front of the mower housing, at a small distance from the clipping outlet 20, and it projects forward. The slot 64 is in the front wall 63 of the box-like part 30, and it extends horizontally and opens away from the discharge side of the mower. As the box-like part is slid onto the mower housing, the stud 62 is received in the slot 64, whereupon a large wing nut 65 on that stud can be tightened to clampingly but readily releasably secure the box-like part to the mower housing.

To support and steady the impeller housing 38 and guide it into place as the front duct section 28 is installed, a lower bracket 67 that is fixed on the top wall 14 of the mower housing cooperates with an upper bracket 68 that is fixed to the underside of the impeller housing. Each of these brackets 67, 68 comprises an edgewise upright flat plate which is elongated in the direction from side to side of the mower. The lower bracket 67 has a relatively wide laterally projecting flange 70 along its lower edge that flatwise overlies the top wall 14 of the mower housing and is bolted or otherwise secured thereto. The upper bracket 68 has a narrower laterally projecting flange 71 along its top edge which flatwise underlies and is welded to the bottom surface of the plate 51 that comprises the bottom wall of the impeller housing. The lower bracket 67 has a horizontally extending slot 72 in its end edge nearest the discharge side of the mower, while the upper bracket 68 has a similar slot 73 in its opposite end edge. Secured to each of the brackets 67, 68, at a distance behind its slot 72, 73, is a large headed stud 75, these studs 75 being spaced at like distances behind the slots in their respective brackets.

As the box-like part 30 is slid onto the mower housing, the brackets 67, 68 slide lengthwise in surface-to-surface engagement with one another until the stud 75 on each is received in the slot 72, 73 in the other. The heads on these studs 75, overlying the remote surfaces of the two brackets, confine them against flatwise separation, and the studs cooperate with the slots 72, 73 to prevent relative up and down movement between the impeller housing and the mower housing. Except for a certain amount of friction, the upper bracket 68 is freely slidable towards and from its assembled position relative to the lower bracket 67, and thus the brackets cannot be said to provide a positive locking of the impeller housing to the mower housing. However, the belt 56, trained under tension around the pulley 55 on the mower spindle 12 and the pulley 54 on the impeller shaft 43, normally confines the impeller housing against shifting towards the discharge side of the mower and thus cooperates with the wing nut 65 to secure the front duct section 22, including the impeller housing 38, to the mower housing. Of course the front duct section can be readily removed by sliding it outwardly after slipping the belt 56 off of the driving pulley 55 and loosening the wing nut 65.

From the foregoing description taken with the accompanying drawings, it will be apparent that this invention provides simple, compact and efficient means whereby clippings issuing from the clipping outlet of a mower mounted at the underside of a riding vehicle are propelled along a clipping duct which communicates the clipping outlet with a receptacle at the rear of the vehicle. It will also be apparent that the clipping propulsion means of this invention can be driven from the engine of the riding vehicle, does not interfere with mowing in confined places and is quiet in operation.

What is claimed as the invention is:

1. Mowing apparatus comprising a riding vehicle, a mower carried by said vehicle that comprises a mower housing having a top wall and having at one side thereof a clipping outlet that lies substantially in a vertical plane, and at least one cutting blade rotatable in a disc-like blade orbit about an upright blade axis which is so spaced in an inward direction from said plane that said blade orbit is substantially wholly within the housing and has a portion adjacent to said plane, a clipping receptacle near a rear end of the vehicle, a clipping duct for conducting clippings from the clipping outlet to the receptacle, and impeller means for propelling clippings along said clipping duct, said mowing apparatus being characterized by:

A. said clipping duct having a front section that defines a passage
 (1) which extends upwardly and rearwardly from said clipping outlet and
 (2) a portion or which is spaced from said plane in the direction away from said blade axis and is above the level of said top wall of the mower housing;

B. said impeller means comprising
 (1) a rotor having
  (a) a rotor axis and
  (b) a plurality of vanes, each of which has a tip portion that extends edgewise substantially radially and parallel to said rotor axis, said vanes being rotatable about said rotor axis for movement of their tip portions in a vane orbit,
 (2) means rotatably mounting said rotor above the top wall of the housing with the rotor axis
  (a) upright and
  (b) so located between said plane and said blade axis that
   (i) one portion of said vane orbit is in said portion of said passage and
   (ii) a substantially opposite portion of said vane orbit overlies said portion of said blade orbit, and
 (3) an impeller housing above said top wall of the mower housing, defining a chamber which surrounds said substantially opposite portion of the vane orbit and which opens to said passage to cooperate therewith in enclosing the rotor; and C. drive means for rotating the rotor in the direction such that the tip portions of its vanes move substantially rearwardly in said one portion of the vane orbit.

2. The mowing apparatus of claim 1 wherein said one cutting blade is mounted at the bottom of an upright spindle which projects through and above the top wall of the mower housing and which is rotatably driven from power means on the vehicle, and wherein said impeller housing has a bottom wall which is spaced above the top wall of the mower housing, further characterized by:
 (1) said rotor having a coaxial shaft which extends through and beneath said bottom wall;
 (2) a driving pulley fixed on said spindle, above said top wall of the mower housing;
 (3) a driven pulley fixed on said shaft, beneath said bottom wall of the impeller housing; and
 (4) a belt trained around said pulleys whereby said rotor is rotatably driven from said power means.

3. The mowing apparatus of claim 2, further characterized by:
 (5) a belt tensioner arm having at one end thereof a pivotal connection with said impeller housing about which the opposite end of the arm is swingable horizontally in opposite directions toward and from a line through said blade axis and said rotor axis;
 (6) an idler pulley rotatably carried by said arm at said opposite end thereof; and
 (7) spring means connected with said arm to urge the same in one of said directions and thereby maintain said idler pulley engaged with said belt for tensioning it around the driving and driven pulleys.

4. The mowing apparatus of claim 1, further characterized by:
 (1) said front section of the clipping duct having another portion which is at the bottom of the clipping duct and which is box-like, with walls that project towards the side of the mower remote from said clipping outlet and extend across said plane to embrace the mower around the clipping outlet, one of those walls having a slot therein that opens to the last mentioned side of the mower;
 (2) said mower housing having an outwardly projecting threaded stud thereon which is received in said slot; and
 (3) a wing nut on said stud, clampingly engaging said boxlike portion of the clipping duct front section to detachably secure the same to the mower housing.

5. The mowing apparatus of claim 4 wherein said front section of the clipping duct has a spout-like top portion which projects rearwardly from its box-like bottom portion and which defines said passage portion, and wherein said clipping duct further comprises a substantially straight tubular section, a front end portion of which is removably connected with said spout-like portion and which extends at an upward and rearward inclination therefrom.

6. The mowing apparatus of claim 4 wherein said impeller housing has a bottom wall which is spaced above the top wall of the mower housing, further characterized by:
 (4) a pair of cooperating elements for supporting the impeller housing from the mower housing, one of said elements being fixed to said bottom wall of the impeller housing and the other being fixed to said top wall of the mower housing;

(5) cooperating means on said elements whereby said one element is confined to sliding motion relative to said other element in directions from side to side of the mower, to and from an operative position of the impeller housing over the mower housing.

7. The mowing apparatus of claim 6 wherein said one cutting blade is mounted at the bottom of an upright spindle which projects through and above the top wall of the mower housing and which is rotatably driven from power means on the vehicle, and wherein said rotor has a coaxial shaft which extends through and beneath said bottom wall of the impeller housing, further characterized by:

(6) a driving pulley fixed on the top portion of said spindle;

(7) a driven pulley fixed on the bottom portion of said shaft; and (8) a belt trained under tension around said driving pulley and said driven pulley for driving the rotor from said power means and maintaining the impeller housing in its operative position.

8. In mowing apparatus comprising a mower that is mounted on a power driven riding vehicle and comprises a mower housing having a top wall and having a clipping outlet at one side thereof and a cutting blade in said housing rotatable on an upright axis which is so spaced towards the opposite side of the mower from the clipping outlet that a portion of a blade orbit defined by rotation of said blade is inwardly adjacent to said clipping outlet, a clipping receptacle at the rear of the vehicle, and a clipping duct defining a passage into which the clipping outlet opens and which leads upwardly and rearwardly therefrom towards the clipping receptacle, impeller means for propelling clippings along said passage, characterized by:

said impeller means

A. being mounted above the top wall of the mower housing and

B. comprising an impeller rotor having
 (1) an upright rotor axis and
 (2) a plurality of vanes, each of which has a tip portion that extends edgewise substantially radially relative to said rotor axis and parallel thereto, said rotor being rotatable about said rotor axis for movement of said tip portions in a vane orbit, C. said rotor axis being so located between said blade axis and the clipping outlet that
 (1) one portion of said vane orbit overlies said portion of said blade orbit and
 (2) another portion of said vane orbit extends beyond said one side of the mower housing to be disposed in said passage, and D. said rotor being driven for rotation in the direction such that said tip portions move substantially rearwardly in said other portion of the vane orbit so that the rotor draws air and clippings out of said clipping outlet and pumps them upwardly and rearwardly along said passage.

9. The mowing apparatus of claim 8 wherein said impeller means further comprises:

an impeller housing over said mower housing which cooperates with said clipping duct to enclose the rotor and which defines a chamber that opens to said passage and surrounds the rotor around said one portion of said vane orbit.

* * * * *